July 4, 1967  C. H. CLARK ET AL  3,329,325
RECORD MEDIUM FEED

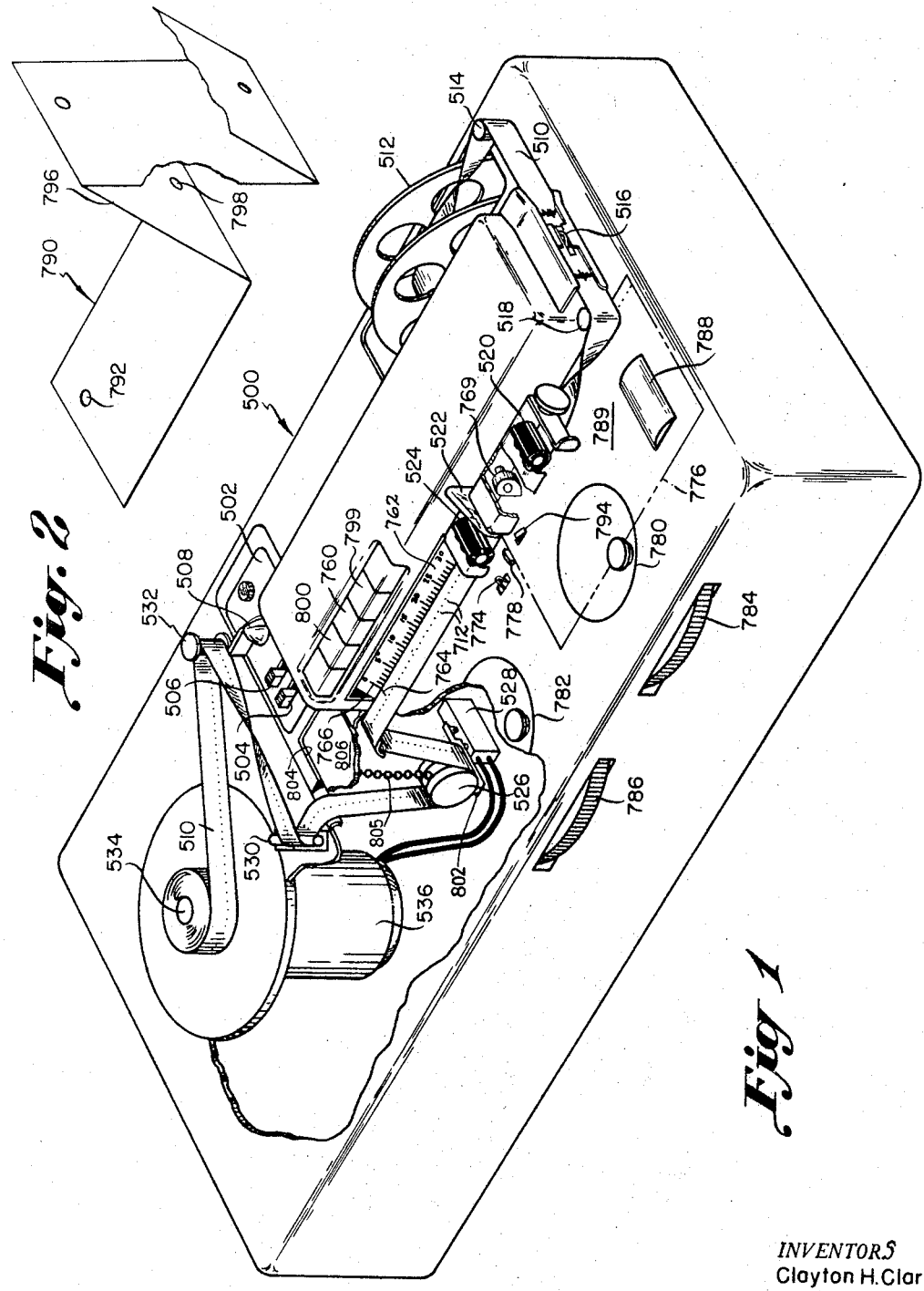

Original Filed Dec. 6, 1961  5 Sheets-Sheet 2

INVENTORS
Clayton H. Clark
Carl P. Anderson

BY Strauch, Nolan, Neale,
Nies & Bronaugh
ATTORNEYS
T-651

July 4, 1967

C. H. CLARK ET AL 3,329,325

RECORD MEDIUM FEED

Original Filed Dec. 6, 1961

INVENTORS
Clayton H. Clark
Carl P. Anderson

BY Strauch, Nolan, Neale,
Nies & Bronaugh
Attorneys

T-651

INVENTORS
Clayton H. Clark
Carl P. Anderson
BY
Strauch, Nolan, Neale,
Nies & Bronaugh
Attorneys

United States Patent Office 3,329,325
Patented July 4, 1967

3,329,325
RECORD MEDIUM FEED
Clayton H. Clark, Mundelein, Ill., and Carl P. Anderson, Homer, N.Y., assignors to SCM Corporation, New York, N.Y., a corporation of New York
Application May 14, 1964, Ser. No. 367,410, now Patent No. 3,274,338, dated Sept. 20, 1966, which is a division of application Ser. No. 157,540, Dec. 6, 1961, now Patent No. 3,205,305. Divided and this application Apr. 28, 1966, Ser. No. 545,963
15 Claims. (Cl. 226—51)

ABSTRACT OF THE DISCLOSURE

A record feed apparatus for data communication record manipulating mechanism, which includes power mechanisms, having a structure for guiding a record past a record work station, a first preliminary record engaging feed arrangement along the record guide path preceding the work station, a second primary record engaging feed arrangement along the record guide path, a drive arrangement connected to the power mechanism and including an escapement type of drive power transfer mechanism to drive both feed arrangements at the same record feed movement, and control and operating mechanism deriving operating power from the power mechanism to cause the first feed arrangement to relinguish feed engagement with the record when the record has been fed past the work station and has arrived at and is in feed engagement with the second feed arrangement.

Copending related applications

This application is a division of copending application Ser. No. 367,410, filed May 14, 1964, now U.S. Patent No. 3,274,338, which is a division of application Ser. No. 157,540, filed Dec. 6, 1961, now Patent No. 3,205,305.

Background and summary

The invention pertains to the feed apparatus for record medium in data recording devices capable of recording data as by punching in coded condition on tape or other medium.

The basic mechanism of the recording device in conjunction with which the record feed apparatus of this invention was developed is fully described in both of the above identified applications and to the extent it is not described herein is incorporated herein by reference thereto.

A primary object of this invention resides in the provision in a high speed recorder of a novel escapement type of record medium feed mechanism.

In conjunction with the preceding object, a further object resides in the provision of a rotatable pin feed wheel engaging punched feed holes in a record medium, the feed wheel and an attached ratchet toothed wheel being rotatably coupled to a power drive through a slip coupling and held against rotation by a double pawl escapement lever cooperatively engaging said ratchet wheel, the mechanism which operates the escapement lever constituting a novel positively driven escapement movement, triggered and positively operated by a power driven cam wheel subsequent to a cocking actuation by energization of a feed solenoid.

In further conjunction with the two preceding objects, a still further object resides in providing a novel backspacing mechanism which is similar to the feed mechanism, however, it differs in that the positive backspacing movement is accomplished by a driven pawl acting on a second ratchet wheel secured to the record feed wheel to step drive the feed wheel backward against the slip coupling bias force and the escapement lever is utilized as a feed wheel detent device.

Still another object resides in the provision of a novel planetary reperforator in accord with the foregoing object in which provisions are made to accommodate different record medium such as tape, cards or fanfold records, and mechanism is provided, rendered operative during fanfold operation to cooperate with prepared fanfold records and automatically feed a new record into a start position upon completion of desired code punching of the preceding fanfold record.

A further object resides in the provision in a perforator of a novel indexing feed apparatus which includes a preliminary record medium feed device and correlated primary record medium feed device. In conjunction with this object further objects reside in the provision of a novel step driven output sprocket feed device coupled with a 1:1 drive ratio to a smooth, clamped roll input feed device rendered automatically inoperative to feed a record or to prevent backspacing of a record medium when the sprocket feed has engaged the record medium; and a card initial position locator correlated in operation with the preliminary record feed device.

Further novel features and other objects of this invention will become apparent from the following detailed description, discussion and the appended claims taken in conjunction with the accompanying drawings.

Brief description of drawings

A preferred structure and embodiment of the invention is shown in the accompanying drawings, in which:

FIGURE 1 is a perspective view of a reperforator version of the present invention, designed to punch a tape, card or other record media, the figure being partially broken away to better illustrate details, particularly those of a tape take-up mechanism;

FIGURE 2 is a view showing fanfold paper (or cards) which may be used in the reperforator machine shown in FIGURE 1;

FIGURES 4, 5 and 6 illustrate the tape feed components for the punching mechanism of FIGURE 1: FIGURE 4 illustrating the rest or normal position with activating solenoid de-energized; FIGURE 5 showing the tape feed mechanism after the activating solenoid is energized and with the cocking lever in a cocked position; and FIGURE 6 showing the tape feed mechanism triggered and tape feeding operation completed;

FIGURES 7, 8 and 9 illustrate the tape back-space mechanism for FIGURE 1: FIGURE 7 illustrating the rest position with activating solenoid de-energized; FIGURE 8 showing the tape back-space mechanism with activating solenoid energized and the cocking lever in a cocked position; and FIGURE 9 showing the tape back-space mechanism triggered and tape back-spacing completed;

General description of preferred embodiment

Figure 3:
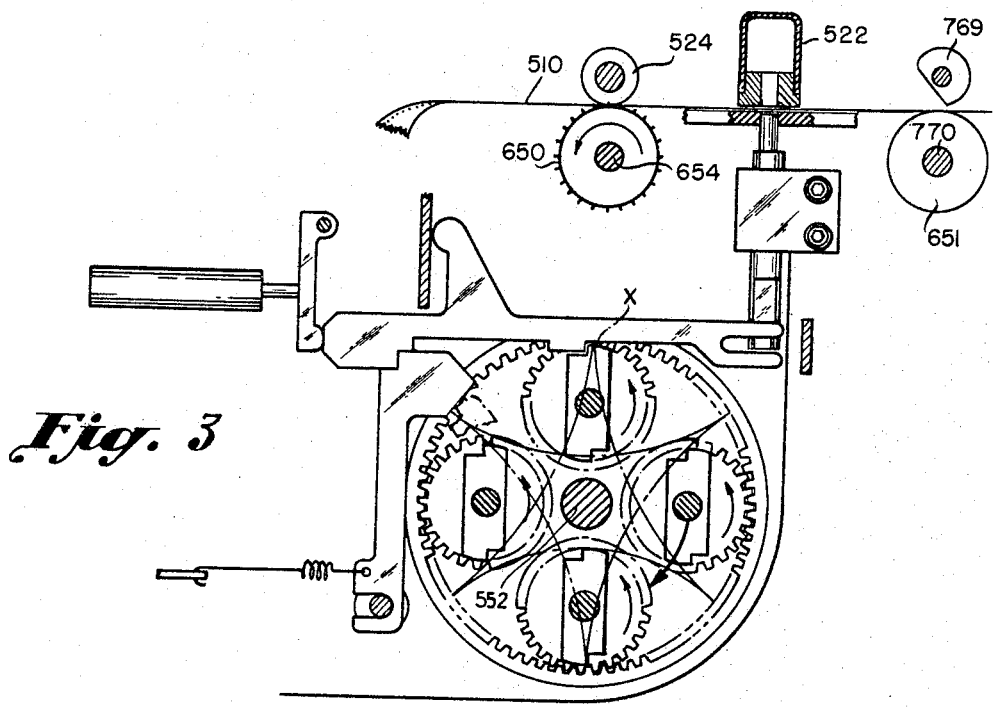
FIGURE 3 is a partially sectioned elevation view of the punching mechanism used in the machine of FIGURE 1 and shows components in a non-punching position and the relationship of the record feed wheels.
Figure 12:
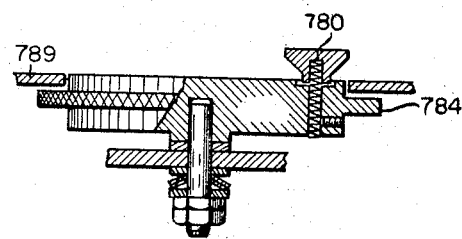
FIGURE 12, on the same sheet with FIGURE 3, is a section detail of one of the adjustable card guides.

A selective perforator apparatus, incorporating the record medium feed apparatus of the present invention, is illustrated in FIGURES 1 and 3–13. This embodiment consists of a compact and complete reperforator unit 500 equipped to receive coded data and punch correlated code holes in record media such as tape, cards or fanfold records. The machine is equipped with mechanism and controls which may be set to enable operation with record media having prepunched feed holes or it may operate with record media requiring feed holes to be punched by the machine 500.

Generally speaking, the unit 500, as depicted in FIGURE 1, is a complete reperforator including power components, perforating assembly, feed means for various forms of record media and controls to enable a varied and versatile operation. FIGURE 1 primarily depicts the machine components, other than the punching and feeding mechanism, with the main control switches 504, 506 and 508 being grouped on a small panel 502 centrally located near the rear of the machine. Switch 504 is an "on-off" switch which must be turned "on" to start the machine. If feed hole punching is desired for any of the possible record media being used, switch 506, the feed hole punch control switch is turned "on." A three position record media switch 508 can be switched to either "tape," "cards" or "fanfold" position to condition the machine to accommodate the record medium to be used.

If the record medium is tape, the tape 510 from a supply reel 512, passes vertical roller 514, an end-of-tape switch station 516, around a tight tape switch operating roller 518 and under a first pressure roller 520. Tape 510 then passes through a die block and guide located directly beneath a chad chute 522, thence under a second pressure roller 524, into a depending loop, the slack of which is taken up by a weighted roller 526 shiftable in a substantially vertical path above a tape take-up motor switch 528. The tape finally passes through tape guides 530 and 532 and is connected to a tape take-up reel 534 drive connected to a take-up reel drive motor 536. Tape path control circuitry utilizing the aforedescribed tape controlled switches may be any of many known constructions.

Assuming the machine is conditioned to perforate on a tape made ready to receive coded messages as described in the preceding paragraph, perforating and feed functions will thereafter occur in accord with received code information. Upon the punch motor switch 504 being turned on, the punch motor 540 (FIGURE 10) starts rotating and, through a belt 542, rotates the shaft 552 of a cam carrier assembly of the punch cam planetary mechanism seen in FIGURE 3 and, although not described herein, being fully described in both of the aforenoted applications.

Feed mechanism and operation

Figure 10:
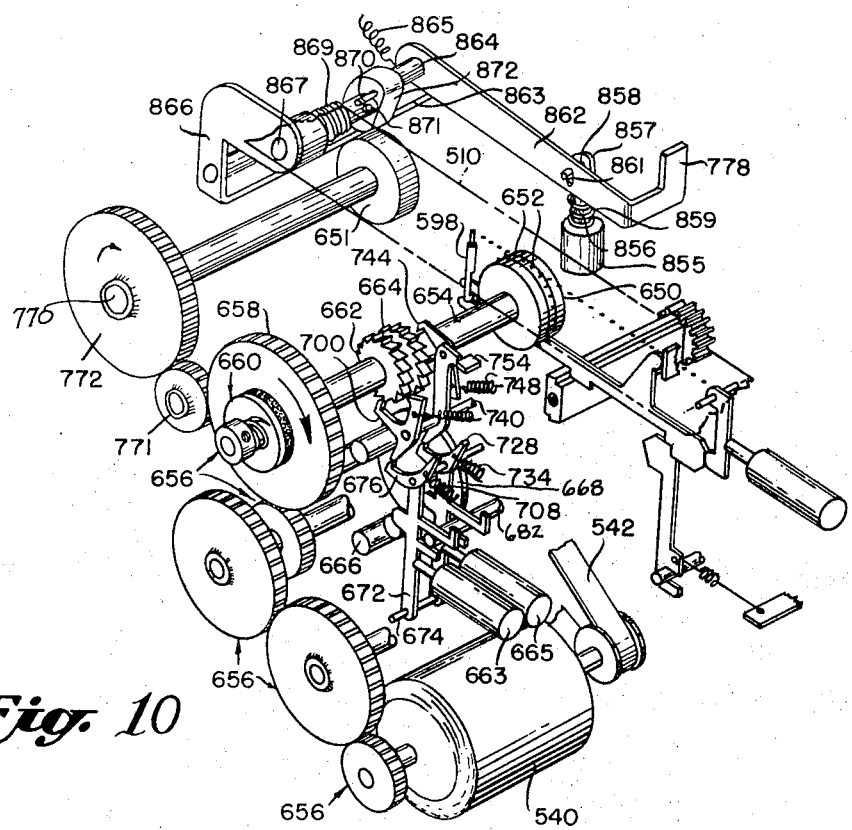
FIGURE 10 is a skeletonized perspective view showing the various punching and feed components illustrated in FIGURES 1 and 3-9, and their relationship to one another.

Primary feed and back spacing of the record medium, tape, cards or fanfold, is accomplished by means of an indexed rotatable sprocket feed roller 650, as seen in FIGURE 10, located below the record media track and positioned just after the punching station. A preliminary indexed feed wheel 651, as will be hereinafter described, is also used in the card and fanfold modes of operation. A plurality of feed pins 652, secured in the periphery of feed roller 650 engage properly spaced feed holes in the record medium so that stepped rotation of roller 650 causes a stepped feed movement of the record medium. The distance of each step movement of the feed roll moves the tape a distance equal to the spacing between adjacent feed pins so that feed holes punched between each feed step are properly spaced. Pre-punched feed holes must, of course, be spaced to fit the stepped feed movement. Similarly, stepped back-spacing movement of the feed roller 650 will back-space the record medium.

The mechanism by which stepped feed and stepped back-spacing are accomplished are inter-related and are illustrated in FIGURES 4–10. All of these figures appear as viewed from the rear of the machine 500. The sprocket feed roller 650 is non-rotatably secured on the end of a shaft 654 which is suitably journalled for rotation in the machine support structure. Rotational power is supplied to feed shaft 654 from the punch motor 540 through a stepped down gear transmission 656 to the input member 658 (a gear) of a friction slip coupling 660, the output of which is drive connected to the feed shaft 654. Also non-rotatably secured on feed shaft 654 are two ratchet toothed wheels 662 and 664. Wheel 662 serves as an escapement wheel which provides motor powered, escapement stepped rotation of feed sprocket 650 through the friction slip coupling 660. Ratchet wheel 664 serves as a pawl driven wheel, the operation of which is against as the rotational force transmitted through the slip coupling 660 to rotate the feed sprocket in a reverse direction.

The organizational relationship of the stepped feed escapement mechanism and the back-spacing mechanism is shown in the skeletonized perspective FIGURE 10 which also illustrates the location of one set (the feed punch set) of the punch operating linkages. The feed escapement mechanism will be described with reference to FIGURES 4–6 and FIGURES 7–9 will be used in describing the back space mechanism. Both mechanisms are cocked by associated individually energized solenoids 663 and 665 and both mechanisms are mechanically triggered by camming action of a roller 666, four of which are carried on and eccentric to the axis of a roller wheel 668. Roller wheel 668 is rotated by means of one of the intermediate gears in train 656, at a speed at least approximately three times the rotational speed of the planetary carrier assembly shaft 552 to assure that one of the four rollers 666 passes an operational camming position during each 30° of rotation of the carrier assembly thereby assuring that a feed escapement step can be accomplished during the time period when the planetary cam carrier assembly rotates a 60° increment provided between a punch retraction operation and the next succeeding punch operation.

The feed escapement mechanism consists of the feed solenoid 663, its plunger 670, a cocking lever 672 which is in the path of and is pivoted to a latched cocked position by movement of plunger 670 when the feed solenoid is momentarily energized. Cocking lever 672 is pivoted at its lower end on a fixed pivot pin 674 and at its upper end pivotally carries a double armed latching lever 676. The right-hand edge of cocking lever 672 has two spaced apart fingers 678 and 680 embracing a horizontal guide post 682 and absorbing a major portion of the shock of impact of a roller 666 against a cam projection 684 on the left-hand edge of the cocking lever 672, which projection 684 is moved into the path of rotation of the rollers when the lever is cocked. The upper finger 680 terminates in a hook lug 686 which engages the head 688 of a position limit screw to determine the cocked limit position of the cocking lever 672.

A double toothed escapement lever 690 is pivoted on a pivot pin 692 fixed in the machine frame, so its two escapement teeth 694 and 696 can be rocked alternately into and out of engagement with the peripheral teeth of escapement wheel 662. The lever 690 is biased clockwise by a spring 698 so its lower tooth 694 normally engages a tooth of wheel 662, and blocks rotation of the escapement wheel. Escapement lever 690 includes a depending arm 700 which terminates in a bent latching lug 702. This lug, in normal position of the escapement linkage, is positioned immediately above a latch hook 704 on one arm of the latching lever 676. The latching lever 676 is biased in a clockwise direction by a spring 708 so its other arm 706 abuts the end of a position limit adjustment screw 710. Through the articulation connection of the latching lever 676 and the cocking lever 672, which pivotally carries the lever 676, the force of spring 708 tends to pivot the lever 676 counter-clockwise (when viewed from the rear as in FIGURES 4–6) about its abutment with screw 710 and also urges lever 672 to its retracted position which maintains the hook end 704 of latch lever 676 spaced just below the latch lug 702 of the escapement lever 690.

*Tape feed operation.*—Tape feed occurs immediately after retraction of the punch levers and punches, at which instant a controlling unit 648 (FIGURE 13) by a one shot signal pulse causes the tape feed solenoid 663 to be momentarily energized, whereby plunger 670 preses against the tape feed cocking lever 672 moving it counterclockwise (see FIGURE 5) and forcing cam projection 684 into the rotating path of a roller 666 on roller wheel 668. The wheel 668, when power is "on," rotates continuously in a counterclockwise direction. As tape feed cocking lever 672 pivots counterclockwise toward cocked position, it shifts the latching lever 676, attached to its upper end, toward the left, i.e., in the same counterclockwise direction, which moves the lever arm 706 from abutment with limit screw 710. As hook end 704 of latch lever 676 moves past the latch lug 702 of escapement lever 690, the latching lever 676 can now pivot clockwise, urged by its spring 708 into a position in which latching lever 676 and escapement lever 690 become latched. Bearing in mind that the solenoid 663 is no longer energized, the moment after this latching occurs, one of the rollers 666 will strike the cam projection 684 on the tape feed cocking lever 672, instantly and positively pivoting the tape feed cocking lever 672 clockwise to its retract position. This retract movement, in turn, moves latching lever 676 in a clockwise direction (about the cocking lever pivot 674). Due to its being latched with escapement lever 690, the initial retraction movement of latching lever 676 will positively pivot the escapement lever 690 counterclockwise to disengage the lower tooth 694 from blocking engagement with a tooth of tape feed escapement wheel 662 on the feed shaft 654.

Because the feed shaft 654 with the tape feed sprocket 650 is friction coupled through slip clutch 660 (FIGURE 10 to motor 540, the feed shaft 654 will instantly start to rotate when the lower tooth 694 of escapement lever 690 is disengaged from the tape feed escapement ratchet 662. However, the shaft 654 will stop rotating almost instantly because clockwise movement of the latching lever 676 which disengages lower escapement tooth 694 causes upper escapement tooth 696 to engage a tooth and block further rotation of the tape feed escapement ratchet wheel 662. Continued shifting of the latching lever 676 clockwise by pivoting of cocking lever 672 causes its upper arm 706 to abut the limit stop screw 710 which cams the hook end 704 of lever 676 down away from its latched engagement with escapement lever 690 clockwise disengaging upper tooth 696 and re-engaging the lower escapement lever tooth 694 with the tape feed escapement ratchet 662, at which stage the tape feed wheel has been indexed one step.

It should be noted that the two engaged teeth on the tape feed ratchet wheel 662 are each indexed one-half a tooth space during each operation of the escapement, and therefore the total rotation of the tape feed sprocket 650 is one feed step. The pins 652 in the tape feed sprocket 650 engage the tape 510 through tape feed holes 712 (see FIGURE 3) and in this manner, the tape 510 is indexed after each printing operation.

*Back-spacing.*—The mechanism for back-spacing will be described with primary references to FIGURES 7, 8 and 9 which clearly illustrate that the back-spacing mechanism utilizes a solenoid 665, a plunger 720, a cocking lever 722 pivoted on shaft 674 and having guide fingers 724 and 725 and a cam abutment projection 726. The cocking lever 722 pivotally carries at its upper end a latching lever 728 which has a hooked end 730 and an upper arm 732 biased by a spring 734 abutting an adjustable screw limit stop 738. The foregoing back-spacing components are substantially identical to the corresponding feed mechanism components. As with the escapement cocking lever 672, the two fingers 724 and 725 on the back-space cocking lever 722 embrace the guide post 682 and the upper finger 725 has an end hook which engages behind the head of a screw adjustment member 738 to limit the cocked position of lever 722.

Pivotally mounted on pivot post 692 is an intermediate transfer lever 740 having a depending arm terminating in a bent latching lug 742 which normally is disposed just above the latch lever hook 730. The upper arm of intermediate lever 740 pivotally carries a back-space spur lever 744 having a depending combined abutment and spring anchor arm 746 and a lateral arm terminating in a spur 750. A tension spring 748 attached between fixed structure and the spur lever anchor arm 746 biases the spur lever arm 746 to a normal inoperative position against the end of an adjustable position limit screw 752 and the bias force of spring 748 also urges the intermediate lever 740 clockwise to its normal inoperative position where its upper end 753 engages a position stop plate 754. In the normal inoperative position of the back-space mechanism, the spur 750 is in alignment with but spaced away from engagement with the back-space ratchet wheel 664 secured to the feed shaft 654.

*Back-spacing operation.*—When back-spacing is desired or becomes necessary, a back-space key 760 (FIGURE 1) located on a central panel on the top of machine 500, is pressed, it being understood that motor 540 is energized and rotating. Back tape solenoid 665 (FIGURE 7–9) is instantly energized, by means of switch 761 (FIGURE 13), and its plunger 720 will strike the back-space cocking lever 722 moving it counterclockwise (FIGURE 8) until finger hook 727 catches on limit stopscrew 736. This movement places cam projection 726 on the backspace cocking lever 722 into the path of a roller 666 on roller wheel 668.

During the counterclockwise cocking movement of back-space cocking lever 722 the latching lever 728 is shifted until its latch end 730 latches in front of the latch lug 742 of the intermediate transfer lever 740. Almost instantly, a roller 666 strikes the cam projection 726 kicking the back-space cocking lever 722 clockwise and it, in turn carries the latching lever 728 with it back to normal position. However, since the latch hook 730 of latching lever 728 is latched with latch lug 742 on the lower end of the intermediate transfer lever 740, it pivots the intermediate transfer lever 740 in a counterclockwise direction. This movement shifts the back tape spur lever 744, located at the top end of the intermediate transfer lever counterclockwise and also permits it to pivot counterclockwise until spur 750 meshes with the teeth of the back-space ratchet 664, the spur lever 744 being urged to pivot counterclockwise on its own pivot by spring 748. As shown in FIGURE 9, this movement of the spur lever 744 shifts the spur 750 into engagement with a tooth on ratchet wheel 664 and also rotates the back-space ratchet wheel 664 counterclockwise one tooth space, indexing the tape 510 back one step.

During back-space indexing the escapement lever 690 coacting with the escapement ratchet wheel 662 provides the detent action to retain the feed shaft in back-spacing position.

Continued pivotal movement of the back-space cocking lever 722 clockwise to its normal position (after being so propelled when roller 666 struck cam projection 726), and because the end of upper arm 732 of the latching lever 728 rides against adjustment screw 738 because it is so biased by spring 734, will cause latching lever 728 to rotate counterclockwise, releasing latch lever hook 730 from engagement with the lower end lug 742 of the intermediate transfer lever 740. Instantaneously, the intermediate transfer lever 740 will snap in clockwise rotation under the bias of spring 748 until it hits stop 754 and at the same time the lower arm 746 of the back spur lever 744, riding on adjustment screw 752, must cause lever 744 to rotate clockwise to retract the spur end 750 away from engagement with the back-space ratchet wheel 664. This sequence of events is repeated until the back-space solenoid is de-energized by releasing back-space key 760.

Returning now to FIGURE 1, there is shown a back tape scale 762 which is used in conjunction with the back-space mechanism. This scale 762 is to be used by the operator to denote the number of spaces to be back-spaced and can be utilized by marking the tape 510 as indicated at 764, with a pencil at "0" denoted at 766 on scale 762. After marking the tape the operator will operate the back-space key 760 and can determine how many spaces the tape has moved backward by watching the position of the mark 764 on tape 510 as it moves along the scale 762. When the proper number of back-spaces have been accomplished, key 860 is released.

Upon completion of a back-spacing operation the operator can then press a delete key on his keyboard (not shown) thereby indicating, as by specific punched code, deletion of the incorrect code holes, and normal operation may then be resumed.

As described with reference to FIGURE 1, the three position switch 508 can be set on "tape," "cards" or "fanfold" although the machine has been described herein as using tape. It is well-known in the data processing field, that when single cards or fanfold records are to be used in a data processing perforator or reperforator machine they are often supplied with pre-punched feed holes. In such cases, operation of the feed hole punch is not desired. The mechanism by which punch selection and retraction is accomplished permits taking the feed hole punch out of operation merely by opening the control circuit to the feed hole punch solenoid which is done by turning the feed hole punch switch 506 to the "off" position.

On the other hand, record cards or fanfold records which are not pre-punched with feed holes can also be used in the present machine and, when used, all punches including the feed hole punch are permitted to operate in the normal manner, the positive acting rugged punch linkage and feed apparatus of this machine being completely capable of punching and accurately locating feed holes as well as the code holes in all records and cards as well as in tape. An important advantage of this feature is that the exorbitant expense of pre-punched record media can be eliminated.

The feature of punching feed holes in the cards and fanfold records is provided by the use of the aforedescribed preliminary feed wheel 651 (see FIGURE 10) and a shiftable clamping D-wheel 769 (FIGURES 1, 10, 11 and 13), the mechanism and operation of which will be hereinafter described. Feed wheel 651 has a cylindrical smooth surface. The surface is not polished, one example having a phosphated finish. As clearly depicted in FIGURE 10, the pre-feed wheel 651 is located on the infeed side of the punch station and is securely fixed on a rotatable shaft 770 parallel with the feed sprocket shaft 654. The two feed shafts 654 and 770 are directly rotatably connected through the slip coupling gear 658, an idler 771 and a gear 772 on the end of shaft 770. The gear ratio is such that the peripheral speed of the pre-feed wheel 651 is exactly the same as the peripheral speed at the outer circumference of the body of feed sprocket 650. Thus, if the D-wheel 769 is shifted down and clamps a card or other record against pre-feed wheel 651, subsequent feed stepping of the primary feed sprocket 650, as has been described will step feed the card or record into the punch station and up to and in engagement with the sprocket feed wheel 650 which then can assume positive step feeding engagement with the feed holes in the record.

In punching single cards, three position switch 508 is set on "card" position, and a card 776 (shown in phantom lines in FIGURE 1) is inserted into the machine from the right until the card edge abuts a retractable card stop 778. Two undercut short posts serve as card guides 780 and 782 which can be set to the appropriate width of the card 776 by rotating attached knurled wheels 784 and 786. As soon as the adjustments for cards being used have been made, a light downward pressure on the card 776 by the operator will depress a card feed plate 788 which will be covered by the positioned card. By means of electromechanical linkage (to be described) the aforedescribed D-wheel 769 is brought down until it firmly clamps card 776 against pre-feed wheel 651 and mechanical linkage will retract the card stop 778 below the top surface of the machine table 789. Retraction of card stop 778 below the table surface actuates a switch 773 which energizes a circuit to the machine controller 648 (FIGURE 13) and permits normal punching operation under control of the system controller to proceed in the manner hereinbefore described. When punching of the card is completed, an end of card feeler 774 will raise up, actuate an end of card switch 775, the card stop 778 will then raise up and its switch 773 will open to deactivate the machine.

When fanfold records are used, the three position switch 508 is set on "fanfold" position and the first fanfold record card unit 790 is fed into the machine with all of the punches conditioned to operate normally unless feed holes are pre-punched. Fanfold card 790 is inserted into the machine until a special pre-punched hole 792 slips over the operating button 794 of a fanfold sensing switch 795 which, when tripped, permits the normal punching operations to be initiated. The first fanfold card is not used for a record because its torn input edge is not a sufficiently accurate locator. The first card of the fanfold strip can therefore be randomed punched or fed through the machine. Upon completion of filling the first fanfold card 790, the control system will be operated to actuate the feed mechanism so the next card 796 is automatically pulled into a position where its special pre-punched hole 798 aligns with the fanfold sensing switch operating button 794. The pattern of operation will be repeated and continues so long as each card is completely filled to a predetermined condition by punching operations. In the event that a card is not completely filled, the machine will automatically stop upon completion of the last punched character. The operator must then press a tape feed out key 799 which, through switch 800, will automatically feed the fanfold card until the next special pre-punched hole 792 is aligned with the fanfold sensing switch button 794 whereupon tripping of the fanfold sensing switch 795 will again cause the machine to resume data punching operations.

Record tape mechanism

Returning temporarily to the tape mode of operation of the reperforator 500 several of the tape feed components will now be described with reference to FIGURES 1 and 13.

Figure 13:
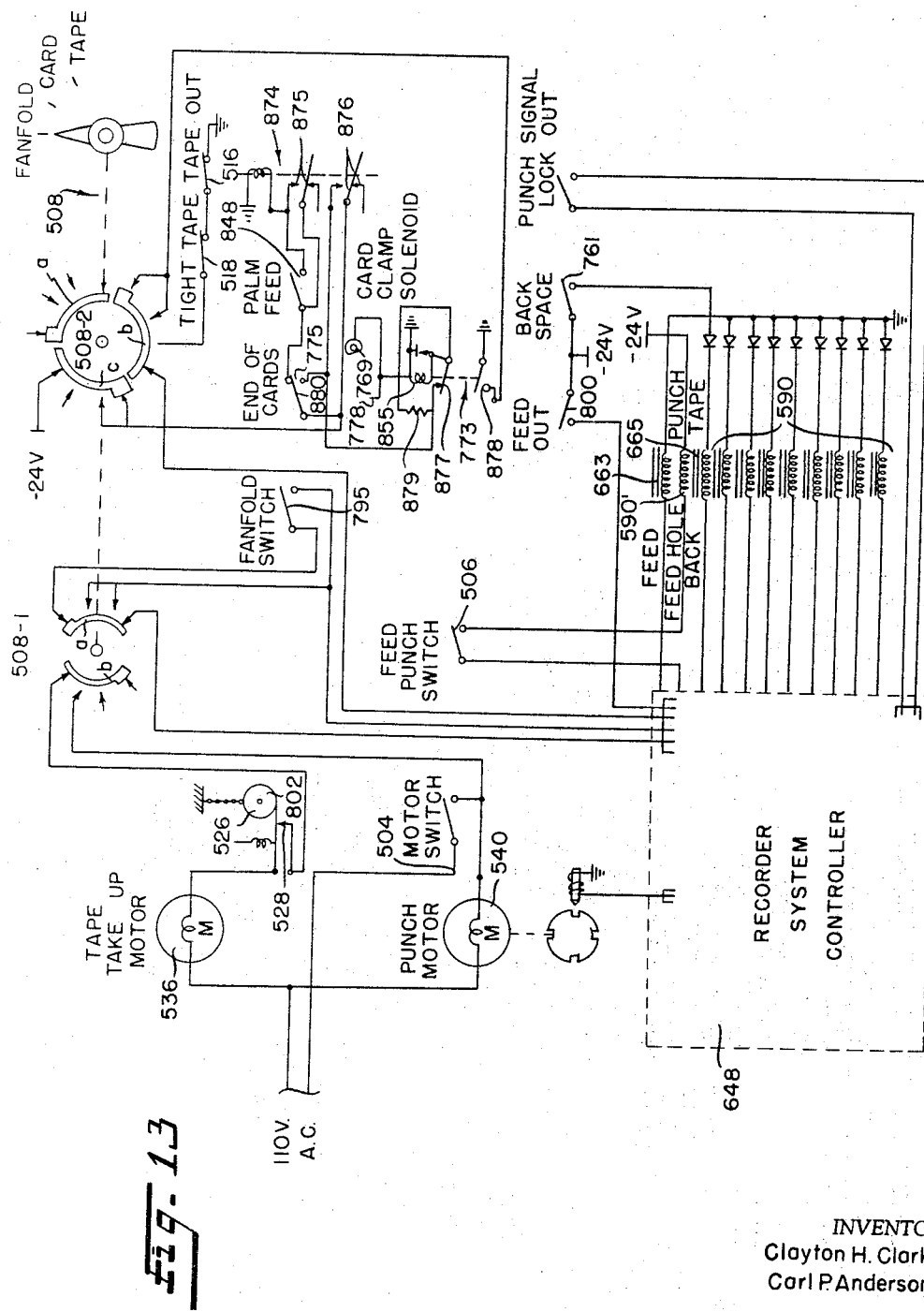
FIGURE 13 is a circuit diagram for the reperforator unit of FIGURE 1.

As readily apparent from FIGURE 1 and as seen in the circuit diagram of FIGURE 13, if the tape 510 breaks or the end of the supply is reached, the tape-out or end-of-tape switch 516 will open and also if the tape 510 becomes caught and tightens the tight-tape switch 518 will open. Assuming that mode selection switch 508 is placed in the tape mode, the two switches 516 and 518 will be in a series control circuit through mode switch bank 508–2, segment b, to the controller 648 which will be rendered inoperative to send control code signals to the reperforator if either the tape-out switch 516 or tight tape switch 518 is opened.

The reperforator punch motor switch 504 is merely an on-off switch in series with the power circuit from punch motor 540 to the AC power source and is not controlled by the mode selector switch 508 or the controller 648.

On the other hand, the tape take-up motor 536 derives its source of power through a circuit connected to the AC power and including tape slack switch 528 in series with switching contacts in mode switch bank 508–1, bridged by segment b in the tape position only of switch 508. Thus positioning of the mode switch 508 in card or fanfold position will open the power circuit to tape take-up motor 536 and render it inoperative.

The other switch 528 in series with the mode switch 508 in the power circuit for the tape take-up motor 536 is an on-off switch spring biased to the "off" position. Depicted somewhat pictorially in FIGURE 1, switch 528 has an extended flag type operator 802 projected to a position under the aforedescribed weighted roller 526. Roller 526 is shaped in the manner of a spool and is guided in a vertical chute (not shown) which is fixed to and depends from the lower surface of the machine table 789. An opening 804 in the table 789 above the chute enables a slack loop in tape 510 to pass down one side of the chute, under roller 526 and up the other side of the chute from whence it passes around the guides 530, 532 and onto the take-up reel 534. A loose chain such as the ball chain 805 is rotatably fastened to a center axle portion of the weighted roller 526 attached to the underside of a chute lid 806, pivotally fastened to the table 789 so the lid 806 will lay flush with the table top when in closed position. The chain 805 enables the weighted roller 526 to be raised and placed over a tape 510 to form the desired slack loop.

The tape slack loop will gradually lengthen under the force of roller 526 as tape is punched and feeds from the punching station until the roller presses the flag 802 downward to close the switch 528 and energize the tape take-up motor 536 which immediately starts to rotate the reel 534 and wind up the tape slack shortening the loop, raising the roller 526 and turning off the switch 528 to de-energize the take-up motor 536. In this manner there will always be a slack length loop of tape held only by the relatively light weight of roller 526 to permit back-spacing of the tape 510 without danger of tearing the feed holes which might occur if back-spacing had to pull the tape against the mass of the reel 534 and motor 536.

*Preliminary feed mechanism*

Figure 11:
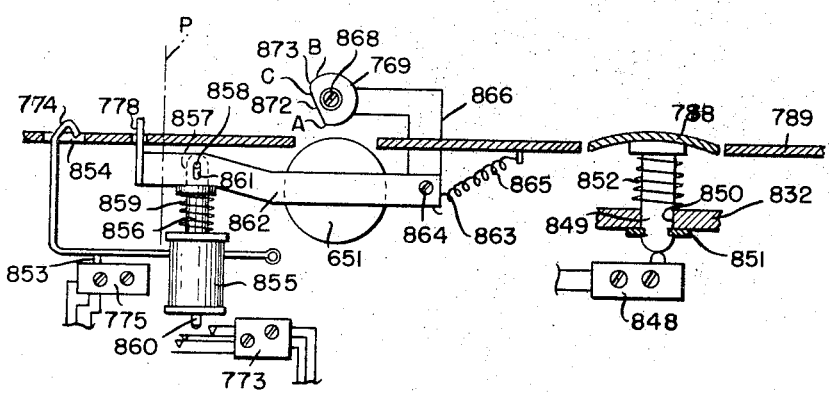
FIGURE 11 is a cross-section view of various card control components, e.g. end of card feeler, car stop, card clamping-pre-feed solenoid and palm plate.

As was previously described, when this machine 500 is in the card or fanfold mode of operation, as determined by mode switch 508, the first fanfold record or a card is inserted (FIGURE 1) until it abuts the card stop 778. The palm feed plate 788 is then operated, resulting in a machine operation which brings the pre-feed D-wheel 769 down and clamps a record card against pre-feed wheel 651, simultaneously withdrawing the card stop 778 and permitting perforator operation to commence. FIGURES 10, 11 illustrate the mechanism for accomplishing such action and FIGURE 13 shows suitable circuitry.

Referring to FIGURE 13, placing of mode switch 508 in either a card or fanfold position will set up a circuit, through mode switch bank 508–2, segment c, to a −24 volt potential, controlled by the two-position end-of-card switch 775 and the open-close palm switch 848.

Shown in FIGURE 11, the palm switch plate 788 has an arcuate contour which raises it slightly above the surface of table 789. Plate 788 has a depending stud 849 guided for vertical movement in an aperture 850 in the machine frame 832. A clip 851 on the lower end of stud 849 limits upward movement of plate 788 and a light compression coil spring 852 biases the plate upwardly. Palm switch 848 is mounted directly under the plate stud 849 so that pressure on palm plate 788 will actuate the switch 848 to a closed position. Then end-of-card switch 775 is mounted under the table 789 and is shown at the left of FIGURE 11, its operating pin 853 being lightly biased upwardly with just sufficient force to support the end-of-card feeler wire 774 in a raised position so it projects through a hole 854 in the table adjacent the feed sprocket. End-of-card switch 775 is normally biased to the position shown in FIGURE 13 and is actuated to its other position solely by the weight of a card or fanfold record on the curved end of the feeler wire 774.

Seen in FIGURE 11 is a solenoid 855 which will be referred to as the card clamping solenoid. The solenoid plunger 856 projects upwardly, terminating in a fork fitting 857 with a cross pin 858, being biased upwardly by coil spring 859. The lower end 860 of the solenoid plunger projects from the bottom of the solenoid and serves as the actuator for the aforedescribed clamping solenoid switch 773.

Plunger cross pin 858 projects through a vertical slot 861 in a horizontal lever arm 862, the bent end of which terminates in the aforedescribed, upwardly disposed card stop 778. Lever arm 862 extends from one side of a U-bracket 863 which is pivotally mounted on a fixed rod 864 and provides an anchor for one end of a tension spring 865 which biases the U-bracket and its lever arm 862 counterclockwise (FIGURE 11), i.e., against the upward bias of the solenoid spring 859. The solenoid spring 859, exerts a force which overpowers spring 865 and thus the cross pin 858 engages the upper end of slot 861 in the lever arm 862 to normally maintain the card stop 778 projected above the surface of table 789 (see FIGURES 1 and 11).

On the other side of U-brackets 863, an L-shaped lever arm 866, extends upward to a position above the table and then horizontally to a location above the pre-feed wheel shaft 770 (see FIGURE 10). Best shown in FIGURE 10 is a horizontal stud 867 rigidly secured in the end of the L-lever 866 and projecting parallel to and above the axis of the pre-feed wheel 651. Journalled on a reduced end of the horizontal stud 867 is the aforedescribed card clamping D-wheel 769, held axially in position on the stud, directly vertically above pre-feed wheel 651, by suitable means such as a retaining screw 868 in the end of stud 867.

The D-wheel 769 is depicted in FIGURES 10 and 11 in its normal, disengaged position in which it is biased under the biasing force of a light torsion spring 869 on the stud so that a horizontal pin 870 fixed in the rear face of D-wheel 769 is abutted to a limit position against a lug 871 fixed in stud 867. As seen from the rear, in FIGURE 10, the D-wheel is biased in a clockwise direction (as seen from the front, in FIGURE 11, it is biased in a counter-clockwise direction) by the torsion spring.

With specific reference now to FIGURE 11, it will be seen that the periphery of D-wheel 769, from location A to location B, is cylindrical and should occupy approximately ¾ of the circumference. Substantially all of the remaining periphery of the D-wheel is a flat surface 872. The intersection between the flat surface 872 and the cylindrical portion results in an intentional rather sharp line at A which, in the normal disengaged and biased position of the D-wheel is disposed a slightly spaced distance above the cylindrical surface of the pre-feed wheel 651 to permit free passage of a record card. The other intersection of the flat surface 872 is faired in a smooth curve 873 between points C and B for a purpose to be described. Note, line P in FIGURE 11 is the center line of the punches.

When clamping solenoid 855 is energized, by circuitry as will be described, the plunger 856 is pulled downward and together with the bias force of the bracket spring 865 causes the card stop 778 to drop below the table surface. The same force and action simultaneously lowers the D-wheel 769 to clamp a record card against the pre-feed wheel 651. The energized limit position of solenoid plunger 856 is adjusted to place the cross pin 858 in abutment at the bottom end of lever slot 861 when the D-wheel is in clamping engagement with a record card and, at such limit position, the lower plunger end 860 has actuated the clamping solenoid switch 773.

With the D-wheel lowered to clamping position, and the card stop withdrawn the reperforator can be operated by the system controller 648 and each cyclically indexed feed step will cause the pre-feed wheel 651 to rotate an incremental angular step. The record card will be moved past the punch station P in precise feed steps under control of the pre-feed wheel and D-wheel 769 which is tightly clamped against the record card. The D-wheel will be rotated an equivalent angular increment against the light torsion bias of its spring 869 by rolling action as the record card moves.

During feed indexing of a record, under control of the pre-feed wheel 651, the punches (assuming the record is not pre-punched) will be punching accurately located and spaced feed holes in the record. If feed holes are already pre-punched, the feed punch actuation will be deleted by opening the aforedescribed switch 506. In either situation the record is stepped by the pre-feed mechanism for each punching cycle until its first feed hole is located in position to be engaged by a pin in the primary feed sprocket 650. The feed holes will be in proper coincidence position because the card stop 778 assured that the first feed hole of pre-punched records and the first hole punched into blank records was so located that subsequent indexed stepping of the record is exactly correlated with sprocket feed pin index steps. It will be recalled that peripheral movement of the primary feed sprocket 650 and of the pre-feed wheel 651 are in a 1:1 ratio.

When the record has been stepped a sufficient distance so the feed sprocket pin 652 engage the feed holes, D-wheel 769 has rotated into an angular position placing the flat surface 872 adjacent the record where the D-wheel is no longer tightly clamped against the record card. Pre-feed stepping by pre-feed wheel 651 will then terminate, even though the pre-feed wheel 651 continues its stepped rotation. At the termination of pre-feed the D-wheel 769 undergoes a slight drop, permitted because the flat surface 872 is adjacent the record card and the slot 861 in lever 862 permits such a movement of the entire bracket 863 under the bias force of spring 865 and beyond the clamp action of the solenoid. The D-wheel as seen in FIGURE 11 can not rotate in a feed direction counterclockwise beyond the point where the flat surface 872 is at its lower horizontal disposition, because the D-wheel stop pin 870 (FIGURE 10) will have rotated to abut the other side of stop lug 871. On the other hand, the flat surface 872 now serves as a pressure foot biased only by spring 865 against the record card which slides under the D-wheel as it feeds on through the machine.

The purpose of the faired curve 873, between points B and C on the out feed side of the D-wheel flat surface 872, is to assure that the D-wheel will not regrip the record and start a reverse rotation during any back-spacing of the record. Such action is not desired because, if the D-wheel were to be reversely rotated while clamping a record, its rotation would very quickly be blocked when its limit pin 870 abutted the stop lug 871 and the record would jam or be torn as the feed sprocket 650 continued to index backwards.

Referring to the circuit diagram of FIGURE 13, it will be seen that when a single record card or a fanfold record is placed in start position against the card stop 778, the various switches 508, 775, 848 are in the illustrated positions. The operator will momentarily close the palm switch 848, energizing the grounded coil of an intermediate relay 874 by means of a circuit through one side of the end-of-card switch 775 thence to mode switch bank 508–2, segment c to a negative 24 volt potential. As soon as relay 874 is energized, a self holding circuit paralleling the palm switch 848 is made through relay switch contacts 875, the end-of-card switch 775 and thence to the same source of potential.

When relay 874 is energized, a second set of switch contacts 876 are closed to complete a circuit through the same mode switch bank 508–2, segment c from the negative 24 volts, through a normally closed set of clamping switch contacts 877, through the coil of clamping solenoid 855 to ground. This causes energizing the coil of the clamping solenoid at full potential. When so energized, clamping solenoid 855 effects lowering of the card stop 778 and positively places the D-wheel 769 in its clamping position. Operation of solenoid 855 simultaneously opens contacts 877 and completes a circuit to permit operation by the system controller 648 by closing a second set of contacts 878. When contacts 877 are opened, the clamping solenoid coil still remains energized, although at a reduced potential, through a by-pass resistor 879 in parallel with contacts 877.

The controller 648 is now operative and the reperforator can start punching operation cycles which step the record along the table, passing it over the end-of-card feeler 774 which actuates the end-of-card switch 775 to its other position, closing contacts 880 to provide a by-pass circuit from the potential at mode-switch bank 508–2, segment c, to the card clamp solenoid. When end-of-card switch 775 is actuated, the holding circuit to the coil of the intermediate relay 874 is opened, thus the card clamping solenoid is now under sole control of contacts 880 in the end-of-card switch 775.

After the record card or the end record of a fanfold strip passes over the end-of-card feeler 774, the feeler is released and will raise to permit biased return of the end-of-card switch 775 to normal position, breaking the circuit to the card clamping solenoid 855, permitting switch contacts 877 to close in preparation for the next starting operation, opening the contacts 878 which through a circuit in the controller 648 prevents further reperforator operation, and permitting the card stop 778 and the D-wheel 769 to return to normal start positions.

The instant that D-wheel 769 raises away from the pre-feed wheel 651 its torsion spring 869 snaps the D-wheel 769 back to the normal position as seen in FIGURE 11. The machine will now be conditioned for the next card of first record of a fanfold strip to be inserted. Note that a positioning of the mode switch 508 to a tape mode will open the clamping circuit from the negative 24 volt potential through mode switch bank 508–2, segment c to the palm switch and preliminary feed operation then cannot be initiated during the tape mode of machine operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a data recording device including, power means and recording mechanism, record feed apparatus comprising: means to guide a thin record medium past a recording station; preliminary record feed means mounted at the infeed side of said recording station; a pin type feed means mounted at the outfeed of said recording station; means adapted to be power operated by said power means under cyclic control of said recording device to impart coincident 1:1 ratio feed indexing movements to both of said feed means; and means controlling said preliminary feed means to automatically relinquish its feed engagement with the record medium when the record medium has been stepped past the recording station a sufficient distance to come into feed engagement with said pin type feed means.

2. A record feed apparatus as defined in claim 1, wherein said preliminary feed means includes: a record medium start location device including a member adapted to be engaged by the thin record medium to limit the start position of the record medium to a predetermined location relative to the pins of the pin type feed means; and means including a control means and a second power means for operating said preliminary feed means into feed engagement with the record medium and for simultaneously removing said start location device from engagement with the record medium.

3. A record feed apparatus as defined in claim 2, wherein said control means includes: an intermittent actuator for energizing said second power means; a holding means for maintaining said second power means energized; and a record controlled trip device having connection with and enabling control of said holding means by a record so long as the record has not reached an end-of-record position and thereafter enabling said holding means to de-energize said second power means.

4. A record feed apparatus as defined in claim 2, wherein said preliminary feed means comprises: a cylindrically surfaced feed roller adapted to engage a surface of a record medium and rotated in coincidence with indexed feed movement of said pin type feed means so its incremental peripheral stepped feed movement is equal to the distance between centers of adjacent pins on said pin type feed means; and an idler D-wheel with a cylindrical portion and a flat portion adapted to be shifted by said second power means toward said feed roller to tightly clamp the thin flat record medium between the cylindrical portion of said D-wheel and said feed roller whereby said record medium is indexed by feed movements of said roller and said D-wheel is conjointly rotated by the passage of said clamped record medium until the flat surface of said D-wheel is rotated to engagement with the record medium whereupon feed clamping of the record medium is disrupted.

5. A record feed apparatus as defined in claim 4, wherein said D-wheel comprises: said cylindrical portion at least equal to a distance which the record medium must travel from its start position to the location where said pin type feed means assumes feed engagement of the record medium; a small radius curved intersection between said cylindrical portion and said flat portion to prevent a reclamping of the preliminary feed during any backspacing of the record medium subsequent to said D-wheel being feed rotated until its said flat surface engages the record medium; and means are connected to said D-wheel to return it to a reset position upon completion of recording machine operations on the record medium.

6. A device for feeding a thin flat record medium past a work station, comprising: a rotatable feed roller adapted to engage a surface of a record medium; a D-wheel with a cylindrical portion and a flat portion; and selectively operable power means for providing a relative shifting movement of said D-wheel and said feed wheel toward and away from each other and, when said D-wheel and said feed roller are relatively shifted toward each other to tightly clamp the thin flat record medium between the cylindrical portion of said D-wheel and said feed roller whereby the record medium is clamped and fed by feed movements of said roller, which conjointly rotates said D-wheel, only until the flat portion of said D-wheel is adjacent the record medium.

7. For use in a data record processing apparatus, a power means and a record feed means comprising: means to engage and guide a thin sheet form record medium past a data processing station; a feed mechanism adapted to engage and shift the record medium through the data processing station; means adapted to be power operated by said power means under cyclic control of said record processing apparatus to index said feed mechanism a predetermined feed step once during each cycle of recording operation comprising: a blocked but constantly biased drive connection between said power means and said feed mechanism; an escapement mechanism operable through an escapement cycle to permit one indexed step of feed shift of said feed mechanism under said biased drive force; a power rotated camming device including at least one camming member; an escapement operating linkage adapted to be shifted to a cocked positive engagement position with said escapement mechanism and projected in the path of said camming member, and positively impacted, triggered and moved by rotational force of said camming member to positively operate said escapement mechanism through one cycle; and a solenoid operator adapted when momentarily energized to engage and shift said escapement operating linkage to its cocked position.

8. A record processing device as defined in claim 7, wherein: means connect said camming device to be continuously rotated by said power means at a sufficiently higher rate of speed than the rate of occurrence of record processing cycles to assure passage of at least one camming member past said escapement operating linkage during a fraction of a record processing cycle and between operational portions of record processing cycles.

9. A record processing device as defined in claim 7, wherein: said feed mechanism includes at least a pin feed wheel rotatably mounted on the outfeed side of said station and each indexing step constitutes a permitted rotation of said feed wheel equal to the angular distance between adjacent feed pins; and said drive connection includes a friction slip coupling and is connected therethrough to said feed wheel, rotation of said feed wheel being normally blocked by said escapement mechanism.

10. A record processing device as defined in claim 9, including a record medium back-space mechanism comprising: a first ratchet toothed wheel non-rotatably secured to said feed wheel; a ratchet driving pawl mechanism including a back-space pawl adapted to be positively shifted from a normal disengaged position to engage a tooth of said first ratchet wheel and rotate said feed wheel one step against the rotational force through said slip coupling; said escapement mechanism including a second ratchet wheel, non-rotatably secured to said feed wheel, and a double toothed escapement lever engaging said second ratchet wheel and normally serving as a detent against forward feed wheel rotation under rotational force through said slip coupling; a back-space pawl operating linkage adapted to be shifted to a cocked positive engagement position with said ratchet driving pawl mechanism with its back-space pawl and projected in the path of said camming member and immediately thereafter, positively impacted, triggered and moved by rotational force of said camming member to positively move said back-space pawl through one cycle; and a solenoid operator adapted when momentarily energized to engage and shift said back-space pawl operating linkage to its cocked position.

11. A record processing device as defined in claim 9, wherein: said feed mechanism includes a preliminary feed means at the infeed side of station having a drive connected and correlated 1:1 feed speed ratio with said pin feed wheel.

12. A record processing device as defined in claim 11, wherein: said preliminary feed means includes: selectively operative control means enabling preliminary feed engagement with a record; and means automatically operable subsequent to selective operation of said control means to render feed engagement of said preliminary feed means inoperative after a predetermined number of feed steps sufficient to pass a record through said station and into feed engagement by said pin feed wheel.

13. In combination with a data record processing device including power means, record feed apparatus comprising: means to guide a thin record medium past record work station; preliminary record feed means mounted at the infeed side of said record work station; second feed means mounted at the outfeed side of said record work station; means adapted to be power operated by said power means under cyclic control of said recording device to impart coincident 1:1 ratio feeding movements to both of said feed means; and means controlling said preliminary feed means to automatically relinquish its feed engagement with the record medium when the record medium has been fed past the record work station a sufficient distance to come into feed engagement with said second feed means.

14. In a record processing apparatus: a feed wheel for feeding a thin record medium past a data processing station; a toothed ratchet wheel with a drive connection to said feed wheel for driving said feed wheel; a back-space pawl shiftable between a disengaged position and an engaged position with respect to said ratchet wheel and in said engaged position shiftable to rotate said feed wheel one step at a time in back-space direction; rotatably mounted camming means having at least one camming member; means for rotating said camming means; a back-space cocking lever shiftable between an uncocked position out of the path of said camming member and a cocked position in the path of said camming member; latching means operatively connecting said cocking lever and said back-space pawl for effecting shifting of said back-space pawl into its engaged position with said ratchet wheel when said cocking lever is shifted from its cocked position toward its uncocked position; and a solenoid operator for said cocking lever, operable when energized, to shift said cocking lever from its uncocked position into its cocked position and to thereby effect a latched condition of said latching means so that when said camming member strikes said cocking lever said camming member positively shifts said cocking lever toward its uncocked position and effects movement of said latched latching means which effects movement of said back-space pawl into its engaged position with said ratchet wheel and to drive said ratchet wheel and said feed wheel one step in back-space direction.

15. In a record processing apparatus as defined in claim 14, means for driving said feed wheel to feed the record medium in the forward direction including a forward feed cocking and triggering lever means shiftable between an uncocked position out of the path of said camming member and a cocked position in the path of said camming member and further including a solenoid operator operable when energized to shift said forward feed cocking and triggering lever means into the path of said camming member to effect feeding of the record in the forward direction by said means for driving said feed wheel.

References Cited
UNITED STATES PATENTS

| | | | |
|---|---|---|---|
| 2,933,931 | 4/1960 | Lisinski | 226—76 |
| 2,995,363 | 8/1961 | Pittwood | 271—51 |
| 3,033,445 | 5/1962 | Dreyer | 226—76 X |
| 3,058,641 | 10/1962 | Peterson | 226—140 |
| 3,149,766 | 9/1964 | Davis | 226—76 |
| 3,181,759 | 5/1965 | Maples | 226—76 X |

M. HENSON WOOD, JR., *Primary Examiner.*

ALLEN N. KNOWLES, *Examiner.*

UNITED STATES PATENT OFFICE
CERTIFICATE OF CORRECTION

Patent No. 3,329,325                        July 4, 1967

Clayton H. Clark et al.

It is hereby certified that error appears in the above numbered patent requiring correction and that the said Letters Patent should read as corrected below.

Column 3, line 31, after "machine" insert -- operation --; column 4, line 5, for "mechanism" read -- mechanisms --; column 5, line 45, after "10" insert a closing parenthesis; column 6, line 31, for "back-spacing", first occurrence, read -- back-space --; column 7, line 23, for "860" read -- 760 --; column 8, line 39, for "randomed" read -- random --; column 10, line 2, for "then" read -- the --.

Signed and sealed this 25th day of June 1968.

(SEAL)
Attest:

Edward M. Fletcher, Jr.                     EDWARD J. BRENNER
Attesting Officer                          Commissioner of Patents